United States Patent [19]

Fuhrman

[11] 4,159,535
[45] Jun. 26, 1979

[54] FRAMING AND ELASTIC STORE CIRCUIT APPARATUS

[75] Inventor: James L. Fuhrman, Cedar Rapids, Iowa

[73] Assignee: Rockwell International Corporation, El Segundo, Calif.

[21] Appl. No.: 871,574

[22] Filed: Jan. 23, 1978

[51] Int. Cl.² .................. G06F 11/00; G06F 13/00; H04J 3/06
[52] U.S. Cl. .................................. 364/900; 178/69.1
[58] Field of Search ... 364/900 MS File, 200 MS File; 178/69.1; 179/15 BS; 307/208, 210, 269; 328/63, 72, 155, 179

[56] References Cited

U.S. PATENT DOCUMENTS

| 3,426,153 | 2/1969 | Kitsopoulos | 179/15 BS X |
| 3,539,997 | 11/1970 | Mahony | 364/900 |
| 3,825,683 | 7/1974 | Pitroda et al. | 178/69.1 |
| 3,867,579 | 2/1975 | Colton et al. | 364/900 X |
| 3,887,769 | 6/1975 | Cichetti, Jr. et al. | 178/69.1 |
| 3,903,371 | 9/1975 | Colton et al. | 179/15 BS |
| 4,016,368 | 4/1977 | Apple, Jr. | 179/15 BS |
| 4,065,862 | 1/1978 | Meyer | 364/200 |

Primary Examiner—Melvin B. Chapnick
Attorney, Agent, or Firm—Bruce C. Lutz; Howard R. Greenberg; H. Fredrick Hamann

[57] ABSTRACT

Apparatus for providing, in a multiplexed fashion, both the operations of framing to determine the position of a framing bit in a stream of data bits and, after framing has occurred, the job of providing slip control for an elastic store. Since these are essentially exclusive functions in that framing only need occur at the initial portion of a cycle and slip control need only occur after framing has been successfully completed, there is no interference between the two functions. The framing is obtained by supplying input data bits to a memory for intermediate storage and then an integral number of frames later comparing the presently received data with that received previously, and if a negative comparison occurs, eliminating that particular bit as a candidate for the framing bit. The same memory is then used along with the same addressing means for providing an elastic store along with slip control.

7 Claims, 13 Drawing Figures

| ADDRESS | A | C | A' | C' |
|---|---|---|---|---|
| 0 | 1 | 0 | 0 | 0 |
| | 0 | 0 | 0 | 1 |
| | 1 | 1 | 1 | 1 |
| → | 1 | 0 | 0 | 1 |
| | 0 | 1 | 1 | 0 |
| 5 | 1 | 1 | 0 | 1 |
| | 1 | 1 | 0 | 0 |
| | 1 | 1 | 1 | 1 |
| | 1 | 0 | 1 | 1 |
| | 0 | 0 | 1 | 1 |
| 10 | 1 | 1 | 0 | 1 |
| | 0 | 1 | 0 | 0 |
| | 1 | 0 | 1 | 0 |
| | 0 | 0 | 1 | 0 |
| | 0 | 1 | 1 | 1 |
| 190 | 1 | 1 | 0 | 1 |
| | 1 | 1 | 0 | 1 |
| 192 | 0 | 1 | 0 | 1 |

FIG. 9

| ADDRESS | A | C | A' | C' |
|---|---|---|---|---|
| 0 → | 0 | 1 | 1 | 0 |
| | 0 | 0 | 0 | 1 |
| | 1 | 1 | 1 | 1 |
| | 1 | 0 | 1 | 0 |
| | 1 | 1 | 0 | 1 |
| 5 | 0 | 1 | 1 | 1 |
| | 1 | 0 | 1 | 1 |
| | 1 | 1 | 1 | 1 |
| | 0 | 1 | 1 | 0 |
| | 0 | 1 | 0 | 0 |
| 10 | 1 | 1 | 1 | 1 |
| | 1 | 0 | 0 | 1 |
| | 1 | 1 | 1 | 0 |
| | 1 | 1 | 0 | 0 |
| | 0 | 1 | 0 | 1 |
| 190 | 1 | 1 | 1 | 1 |
| | 1 | 1 | 1 | 1 |
| 192 | 0 | 1 | 0 | 1 |

FIG. 10

FRAMING AND ELASTIC STORE CIRCUIT APPARATUS

THE INVENTION

The present invention is generally related to electronics and more specifically related to interfacing between telecommunications data channels having different short-term clock frequencies.

BACKGROUND OF THE INVENTION

The prior art telecommunications interfacing to a load or end user has required an elastic store to adjust the frequency rate of incoming data, as established by a remote oscillator, to a local oscillator and a framing circuit to determine the location of the right data for a given communication channel. It is generally uneconomical to adjust all oscillators in a telecommunications network so that all data is synchronized. The telephone company in its T carrier type lines does not even attempt to keep these devices synchronized on a short-term basis. On a long-term basis, however, the frequencies are fairly well stabilized. The lack of synchronization between distant oscillation in a T carrier communication line requires that there will be some type of elastic store. This requirement is imposed by the short-term instability in frequency of the distant oscillators used to provide a clock for establishing the rate of data transmission. Thus, at an end user load, the elastic store is normally used in conjunction with a framing circuit to allow a local oscillator to receive data at its desired rate, even though this rate will be faster or slower than the rate that data is being transmitted to the device incorporating that local clock and to distribute data to the appropriate data channels. While the prior art generally uses a shift register type elastic store such as illustrated in a Mahoney U.S. Pat. No. 3,539,997, the present inventive concept utilizes a random access memory to provide an improved type of elastic store operation. This improved elastic store is described in somewhat more detail in my co-pending application Ser. No. 871,575, filed on even data herewith and assigned to the same assignee as the present invention.

By careful consideration of the requirements for both the framing and elastic store functions, I was able to combine the above functions into a single circuit thereby eliminating parts, weight, and final cost.

It is thus an object of the present invention to provide an improved elastic store and framing circuit.

Other objects and advantages of the present invention may be ascertained from a reading of the specification and appended claims in conjunction with the drawings wherein:

DETAILED DESCRIPTION

Figure 1:
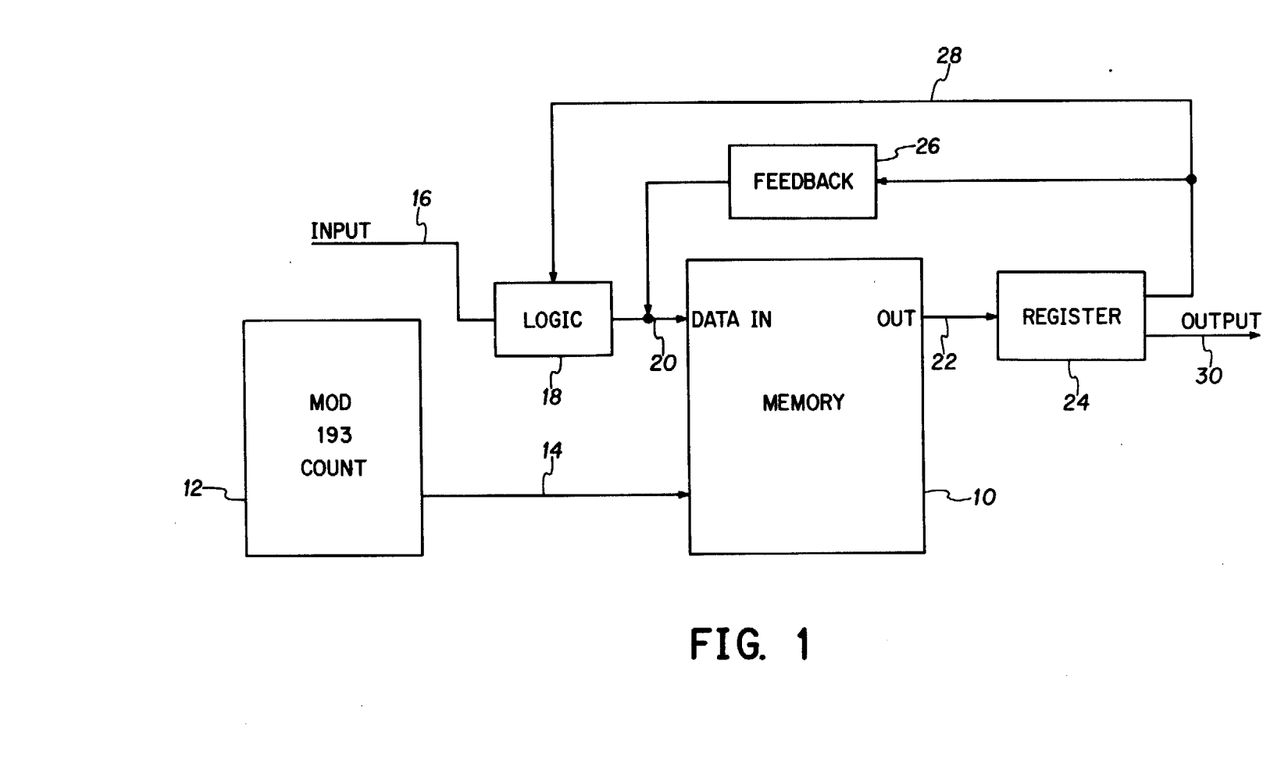
FIG. 1 is a block diagram of the framing circuit concept used in this invention.

In FIG. 1 a memory or data store circuit 10 receives a modulo 193 count from a counter block 12 on a line 14. Data is input in serial fashion on a lead 16 through a logic gate 18 and via a lead 20 to a data input of memory 10. Data is output on a lead 22 from memory 10 to a register 24. An output of register 24 is supplied to a feedback circuit 26 on a lead 28 as well as to logic 18 for use in a comparison procedure to be later described. Register 24 also outputs data and framing information on a plurality leads 30.

Figure 2:
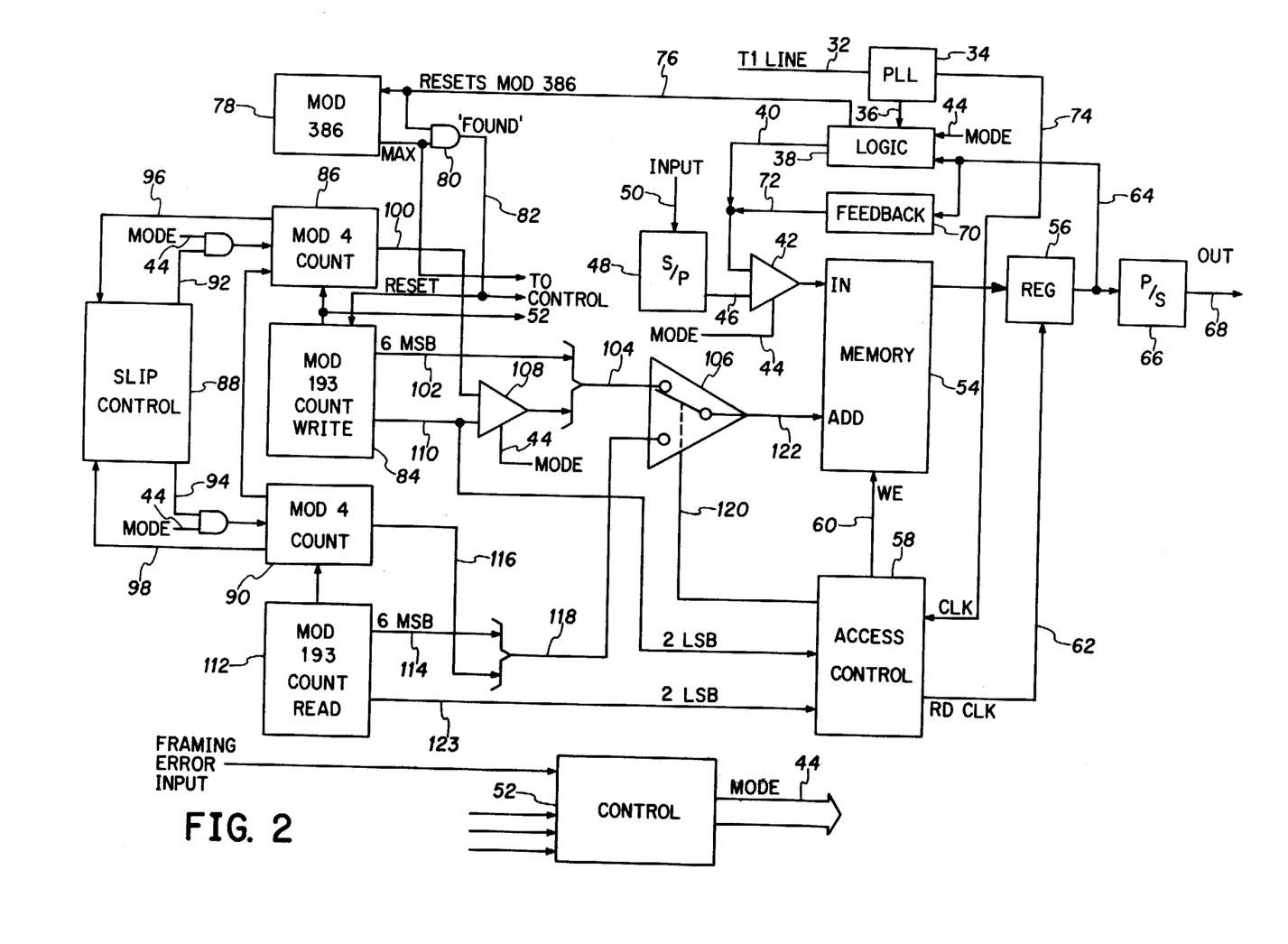
FIG. 2 is a block diagram of the combination of the framing circuit and the slip control circuit used in the elastic store.

In FIG. 2 a T1 line inputs serially formatted data logic bits on a lead 32 to a phase-lock loop and demodulator 34 providing signals on a lead 36 to a logic block 38. Logic block 38 provides output signals on a lead 40 to the input of a multiplexing switch or select switch 42. Switch 42 receives control inputs on a mode control input 44 and receives further data inputs on a set of leads 46 from a serial to parallel converter block 48 which receives data input on lead 50. The signals on lead 50 are substantially identical to the signals on lead 32 but have been separated for convenience. A control block 52 provides mode control outputs to various blocks on a plurality of leads generally labeled as 44, one of which has already been described as being supplied to select switch 42. Another mode input 44 is supplied to logic block 38. An output of select block 42 is provided to an input of a memory or storage means generally designated as 54 having an output supplying signals to a register 56. An access control block 58 supplies input signals on a write enable input lead 60 to the memory 54. Block 58 also provides read clock signals on a lead 62 to register 56 to access data from memory 54. An output of register 56 is supplied on a lead 64 to a parallel to serial converter block 66 which has an apparatus output 68 and also supplies these signals to the logic block 38 as well as to a feedback circuit 70. Block 70 provides output signals on a lead 72 which combines with the signals on lead 40 to provide a set of parallel inputs into the select block 42. Phase-lock loop 34 provides recovered clock signals on a lead 74 to the access control block 58.

Logic 38 provides a final output on a lead 76 which is used to reset a modulo 386 counter 78. This signal is also supplied to an AND gate 80 which receives a second input from counter 78 indicating that counter 78 has reached a maximum count condition thereby providing an indication that the framing bit has been found. This output from AND gate 80 is supplied on a lead 82 to reset a modulo 193 write counter 84. Overflow of modulo 193 counter 84 is used to provide a count input to a modulo 4 counter 86. A slip control block 88 is used to provide enabling signals to the mod 4 count block 86 as well as to a mod 4 count block 90 on leads 92 and 94 respectively. These counts are enabled in unnumbered AND gates by signals from the set of mode control leads 44 as output by control 52. The slip control receives its input signals from the two mod 4 counters on leads 96 and 98 respectively. The two bits of data output from mod 4 counter 86 are supplied on lead 100 and combined with the six most significant bits of counter 84 on a lead 102 as inputs on a lead 104 to a select block 106. The signals on lead 100 must be supplied through a further select block 108 which is also activated by control block 52. This transfer of signals from 100 through block 108 to the set of leads 104 occurs under normal operations while in the framing mode of operation signals for the two least significant bits are supplied through a lead 110 from write counter 84 through the select block 108. Lead 110 is also connected to provide the two least significant bits to the access control block 58 for use in accurately controlling the serial to parallel and parallel to serial converter blocks 48 and 66 respectively. A modulo 193 read counter 112 is used to supply the six most significant bits thereof on a lead 114 wherein they are combined with signals on a lead 116 from modulo 4 counter 90 on a set of leads 118 and input to switch 106. Switch 106 is controlled via signals on a lead 120 so as to determine the source of signals from block 106 to the address input of memory 54 on lead 122.

Figure 3:
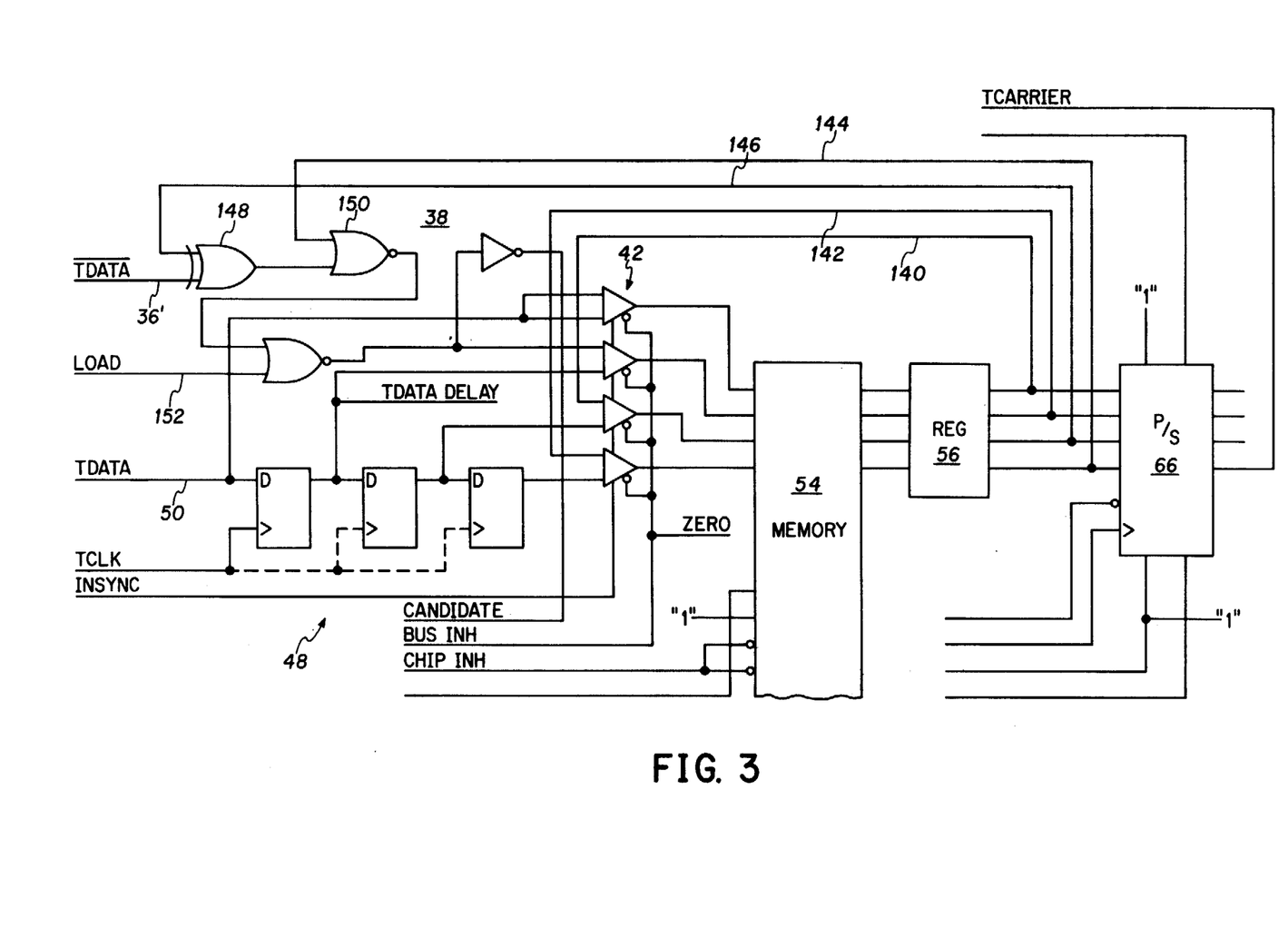
FIG. 3 is a detailed schematic diagram of the logic, feedback, register and memory portions of FIG. 1 as well as the similar multiplexed portions of FIG. 2.

In FIG. 3 the upper lefthand portion is generally the logic portion 38 of FIG. 2. The incoming data is substantially that on lead 36 and this is illustrated as lead 36' in FIG. 3. The various multiplexing switches 42 are shown generally.

In actuality the feedback shown as 70 in FIG. 2 does not exist as such. Rather, the memory 54 comprises two columns of two bit nibbles, where a nibble is half a four bit word or byte. With 193 bytes stored in memory, the incoming data bits are written into memory as the first part or more significant part of a byte and are then transferred from the incoming locations via leads 140 and 142, through the switches 42 to the lesser significant positions or last part in the byte in the first read addressing sequence and are output as the appropriate bits to be compared in the second addressing sequence on leads 144 and 146. As will be explained infra, the data bits are compared in an exclusive OR gate 148 and if the comparison is negative, the candidate bit being returned on lead 144 is prevented from passing through a NOR gate 150. If however the comparison is positive the candidate bit location remains as a possibility for the finally determined framing bit. The register 56 is a 74 LS 174 chip while the parallel to serial converter 66 is a 74 LS 194 chip. The three D flip-flops illustrated in the lower portion of FIG. 3 perform the serial to parallel operations of block 48 in FIG. 2. A load lead 152 is used to initially load all logic "0" candidate bits into memory before the framing sequence is commenced.

Figure 4:
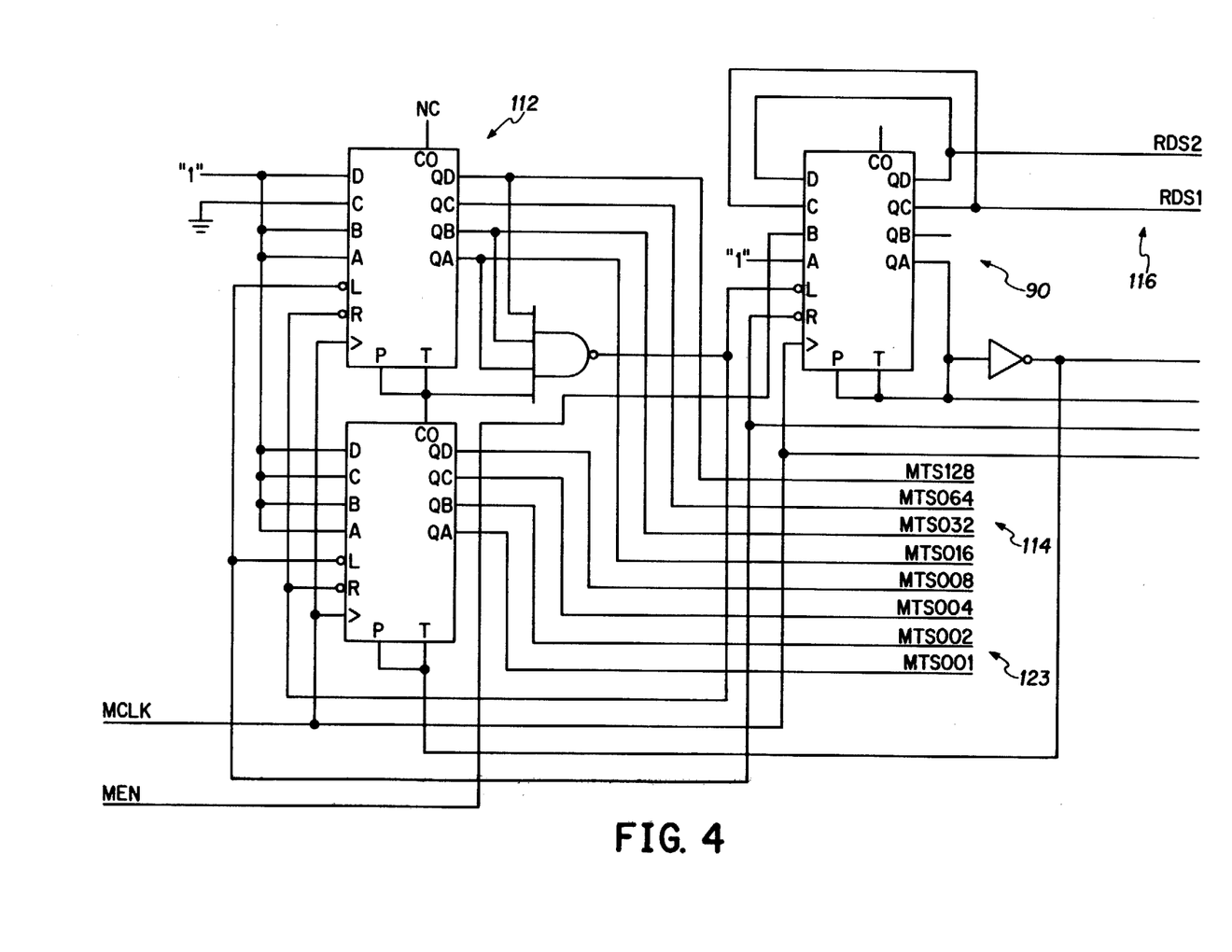
FIG. 4 is a detailed schematic diagram of the modulo 193 read counter along with the modulo 4 counter associated therewith in FIG. 2.

In FIG. 4 the modulo 193 counter and modulo 4 counters 112 and 90 are illustrated wherein the two chips for the counter 112 as well as the chip for 90 are each 74 LS 163 chips. All the various chips described in this specification are standard manufacturers part numbers and are available from any of a plurality of semiconductor manufacturers using the same chip number Texas Instruments, in particular, produces all the chips while National Semiconductor and Motorola each produce most of the chips. The various designations and mnemonics used on the drawings were incorporated from schematics of an actual embodiment of the invention and are included for completeness of disclosure but will not necessarily be mentioned in the description since the implementation of the invention will be obvious to one skilled in the art given the types of chips and the general connections as well as the block diagram of FIG. 2. It will be mentioned however that the six most significant bits of counter 84 are output on the upper six leads shown generally as 114 while the two least significant bits are designated by 123. The two bits from the mod 4 counter 86 are output on leads RDS1 and RDS2.

Figure 5:
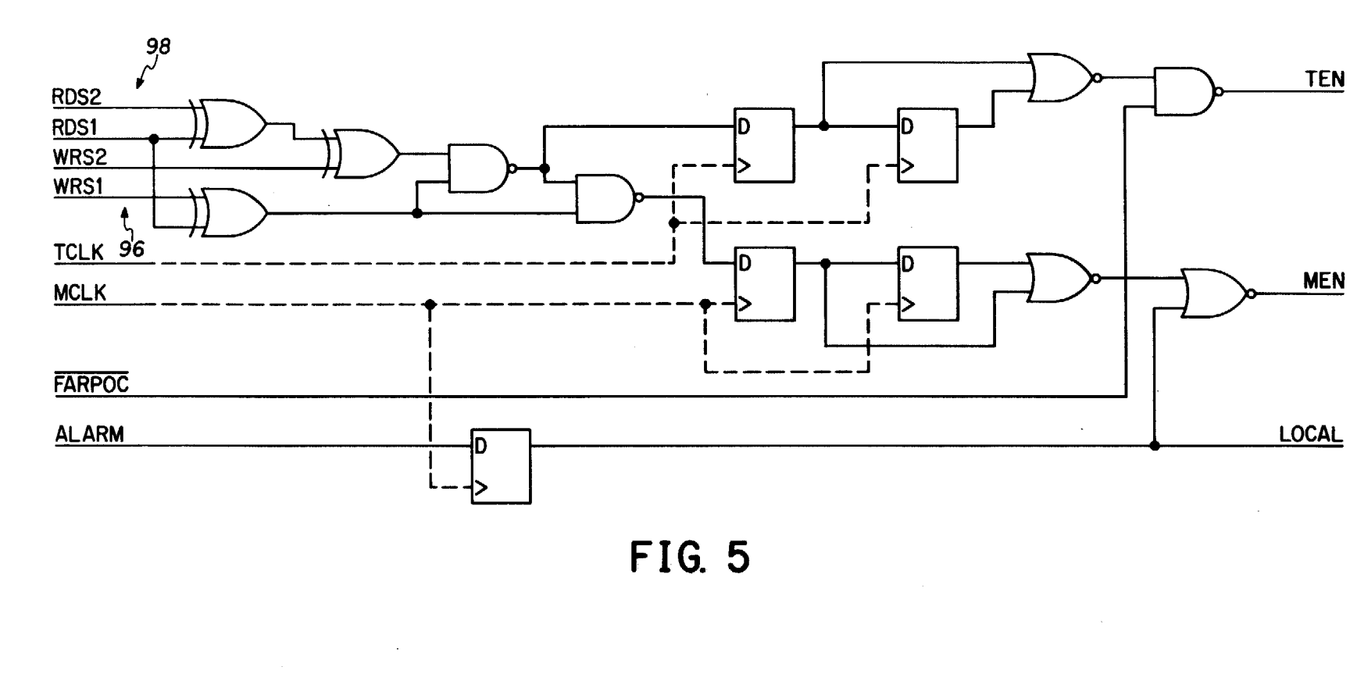
FIG. 5 comprises a detailed schematic diagram of the slip control portion of FIG. 2.

The slip control circuit of FIG. 5 is more completely detailed in my previously referenced co-pending application Ser. No. 871,575. The purpose of this slip circuit is to receive the counts from the mod 4 counters associated with the read and write counters in FIG. 2 and when the counts get too close, prevent enablement of an appropriate mod 4 counter and thereby prevent interference between read and write operations in memory 54. Such interference is prevented since the mod 4 counters constitute the most significant bit values in the addresses used for the read and write operations. Basically the signals from the read leads are generally obtained on 98 while the signals from the write leads are generally obtained on 96. The gates at the far right of FIG. 5 are used for initialization purposes in the circuit operation.

Figure 6A:
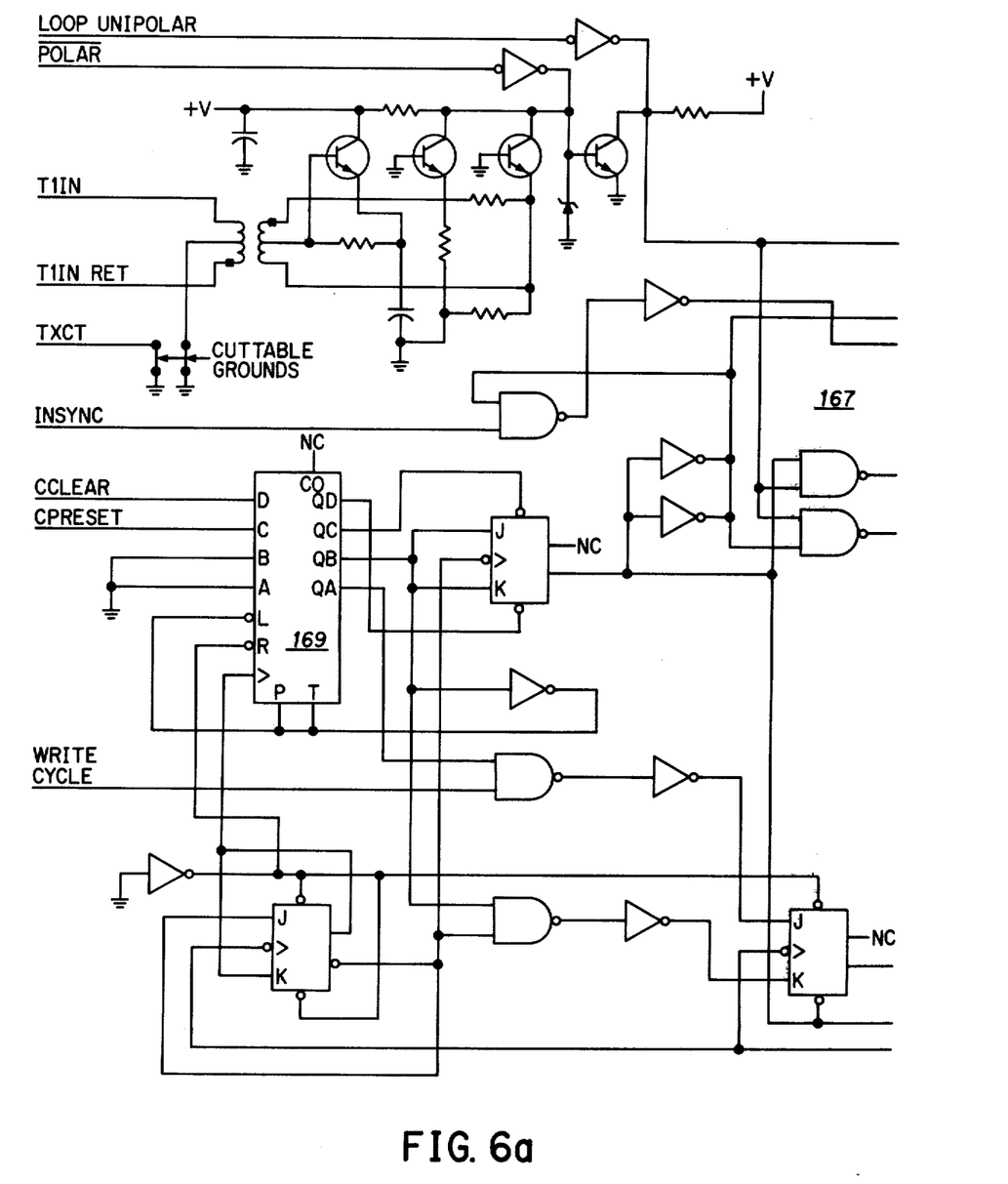
FIGS. 6a and 6b are detailed schematic diagrams which comprise the phase-lock loop and T carrier demodulator of FIG. 2.
Figure 6B:
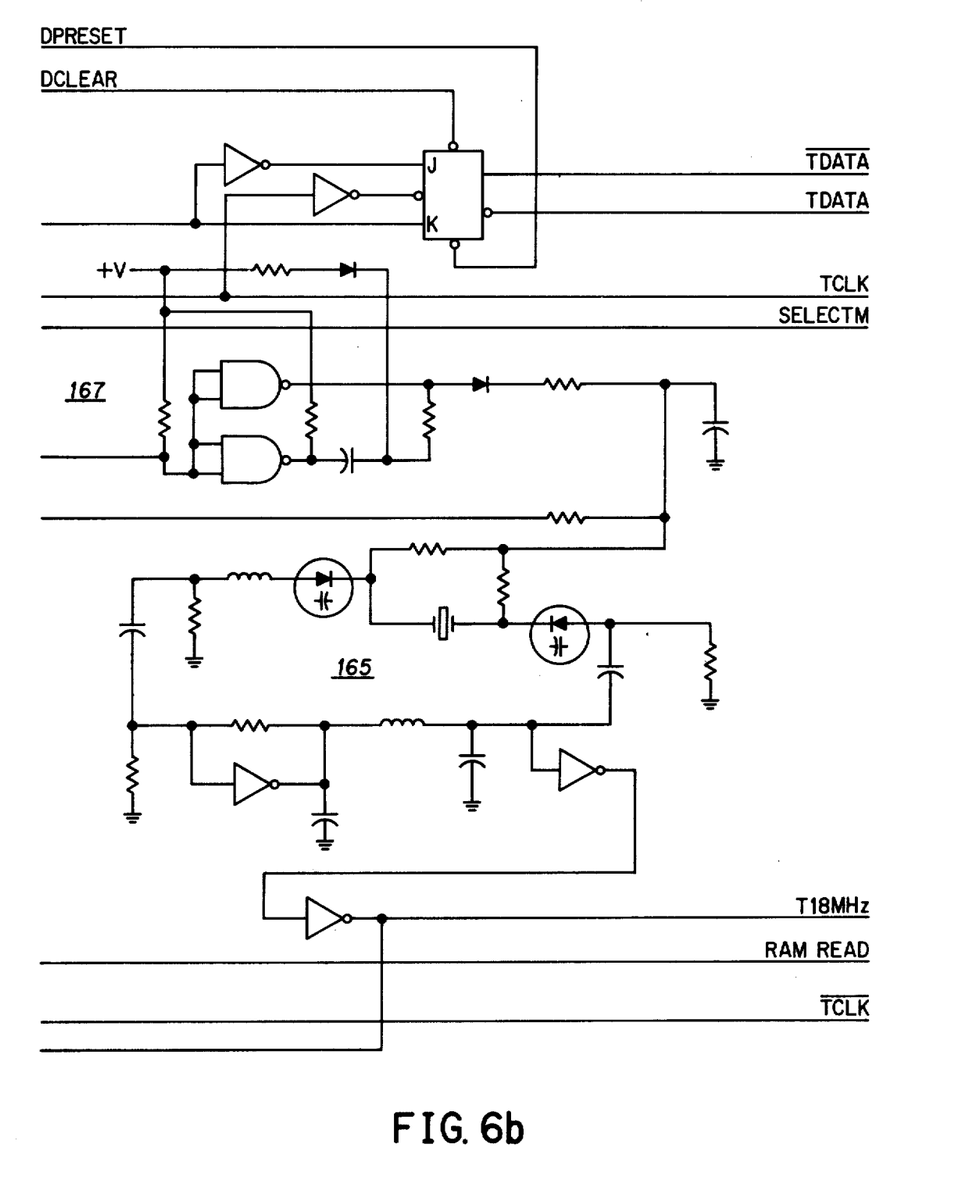

The apparatus of FIGS. 6a and 6b constitutes the phase-lock loop and demodulating circuits and the circuits illustrated therein are more specifically described in my co-pending application Ser. No. 871,655 assigned to the same assignee as the present invention. In general the portion 165 is an oscillator while the area immediately above and to the left of it is a combination phase detector, voltage doubler and low-pass filter and is labeled 167. The only other possible question as to the circuitry is the chip designated as 169 which is a 74 LS 163. This counter is used as a frequency divider in the feedback portion of the phase-lock loop.

Figure 7A:
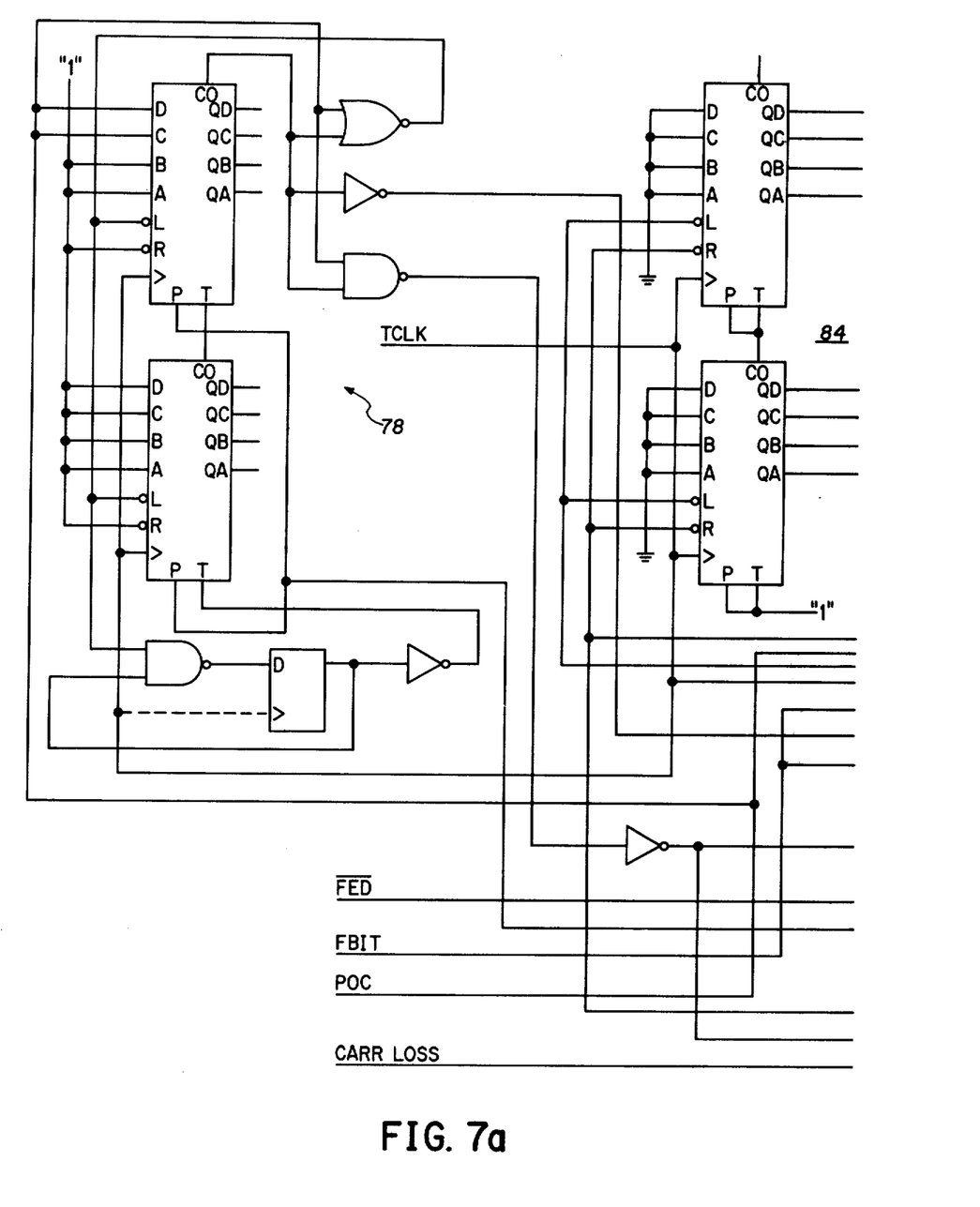
FIGS. 7a and 7b are detailed schematic diagrams of the candidate or write counter as well as the state control blocks.
Figure 7B:
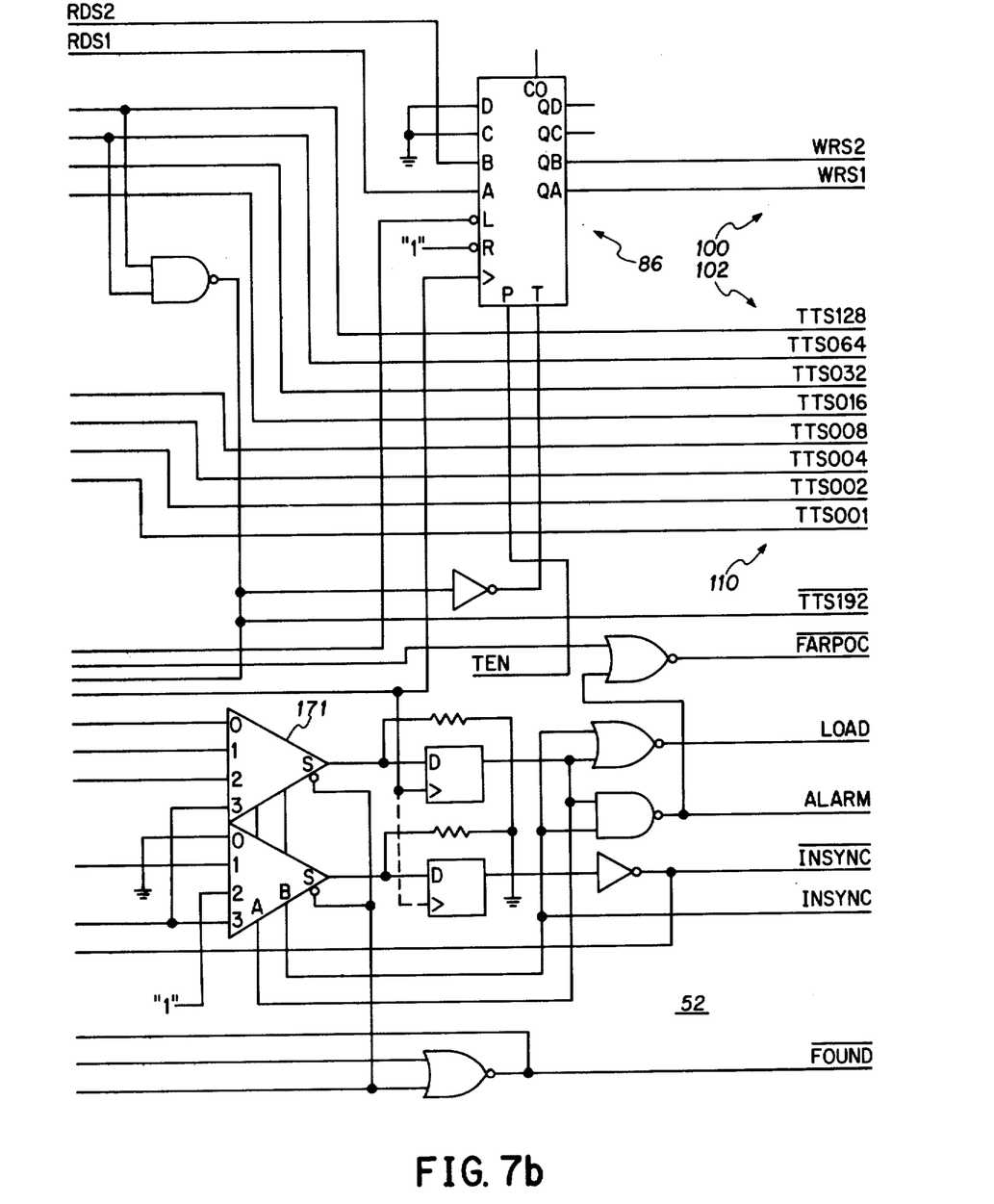

In FIGS. 7a and 7b the two blocks generally designated as 78 constitute the chips for the modulo 386 candidate counter and each chip is typically a 74 LS 163. The write counter generally designated as 84 also uses 74 LS 163 chips as well as the modulo 4 write counter 86. The circuitry in the lower portion of both FIGS. 7a and 7b constitutes a portion of the state control block generally designated as 52. The chips such as 171 may be any of several devices such as a 74 LS 153 or 74 LS 253. As may be noted, the state control block provides information to other circuits regarding the overall state of the circuits. These circuits also produce signals indicating that the devices are in synchronization or not and load signals for initializing the framing circuit. Over on the right in the upper portion of FIG. 7b it will be noted that the various logic bit output leads of the write counter are shown and are designated by their appropriate general designations from FIG. 2.

Figure 8A:
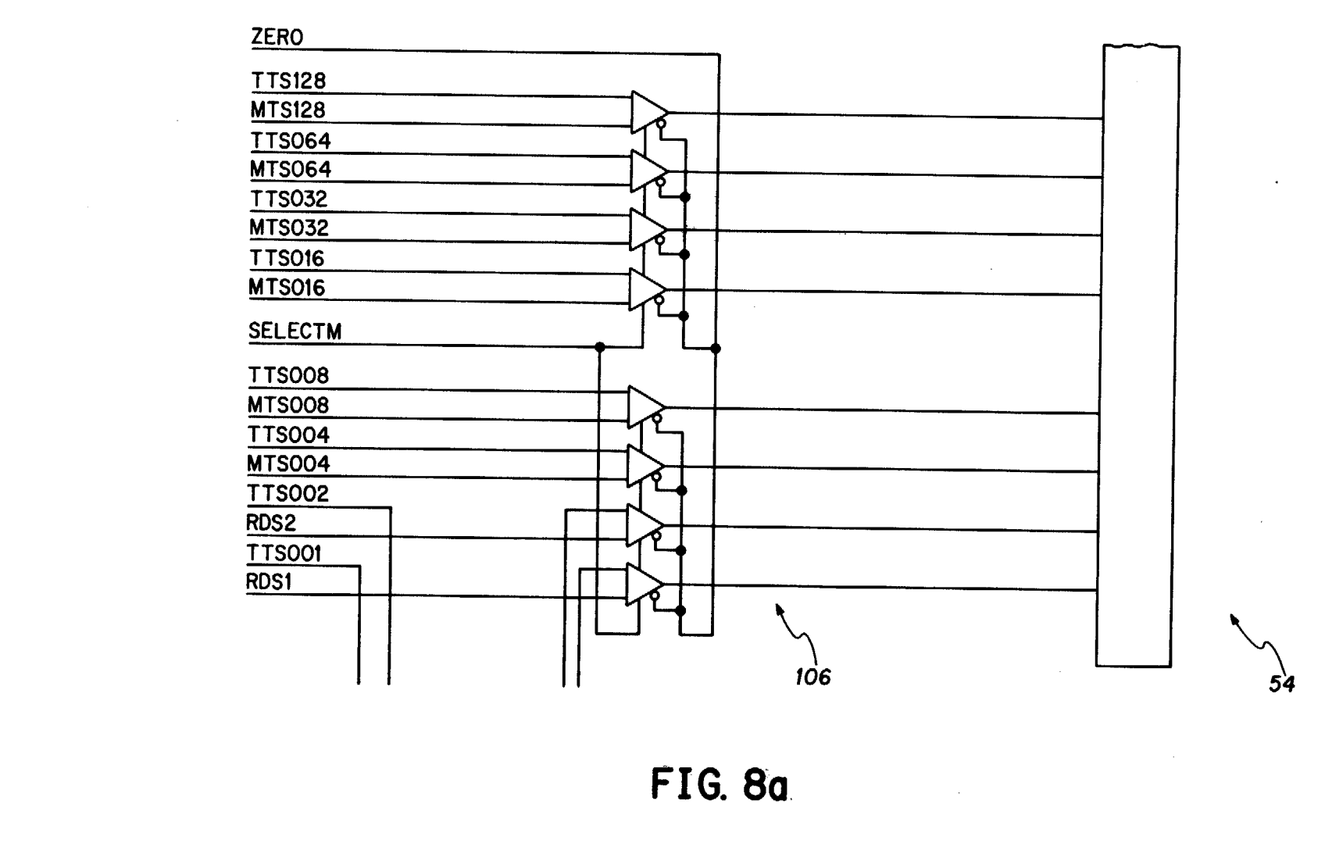
FIGS. 8a and 8b comprise a block schematic diagram of the address selection function and memory access control of FIG. 2.

In FIG. 8a an address selection function is performed by the plurality of switches designated generally as 106. Although the memory 54 is illustrated elsewhere in this plurality of drawings, this is shown here to illustrate the details of the address input portion thereof.

Figure 8B:
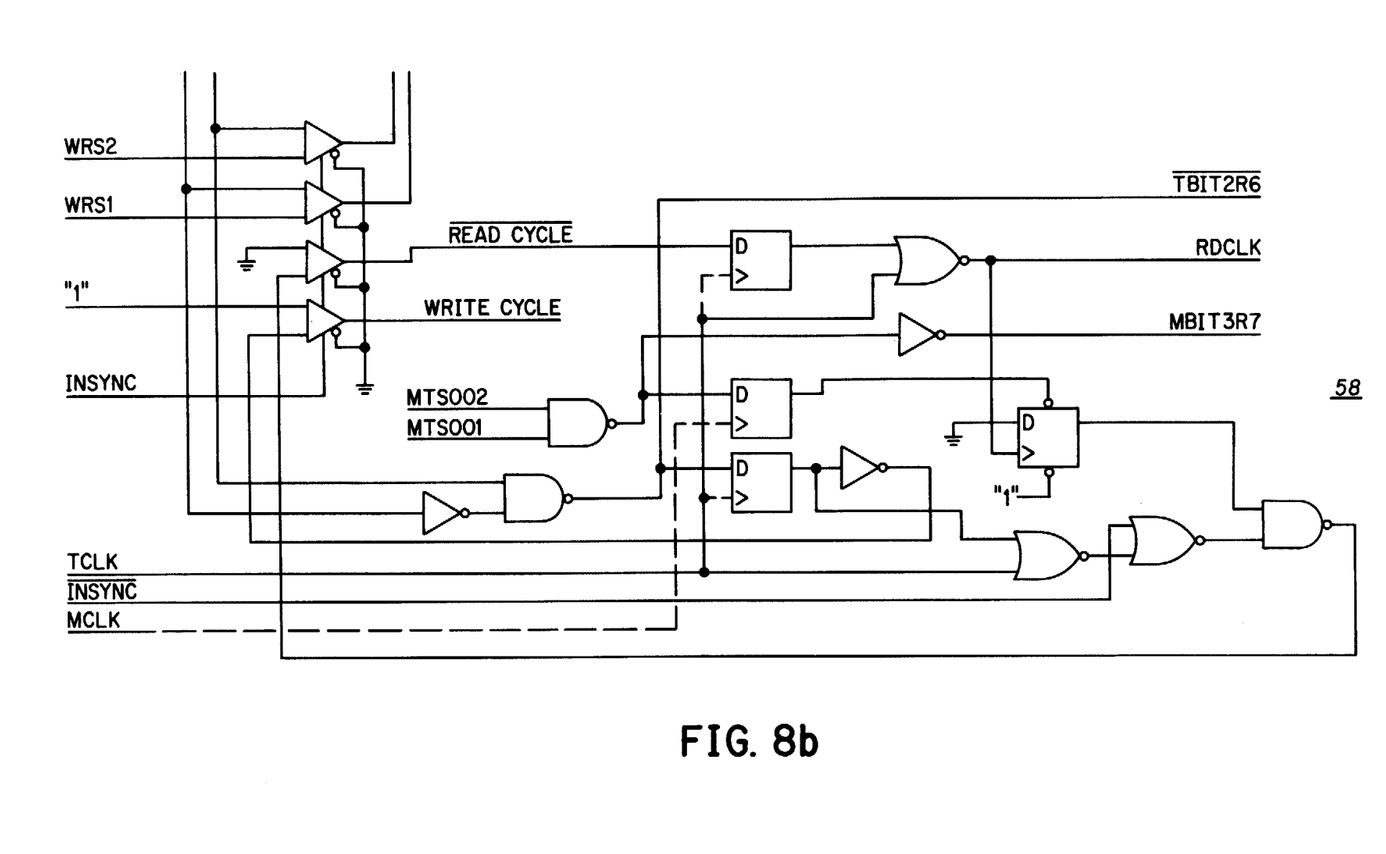

FIG. 8b illustrates primarily the memory access control generally designated as 58.

Figure 9:
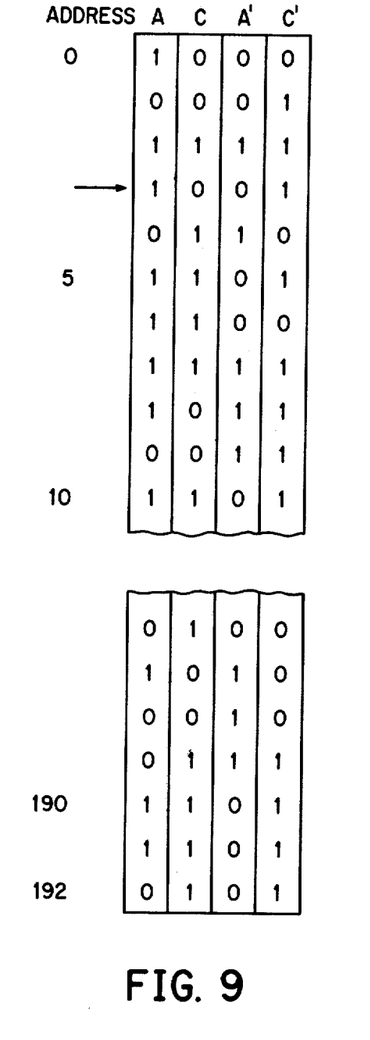
FIG. 9 is a representation of memory 10 as configured in the framing function.

In FIG. 9 a chart is drawn illustrative of a memory having four bit bytes with the memory capacity being 193 bytes ranging in address from 0 to 192. A pointer is directed at address 003. As arranged the first column of bits under label A are representative of data bits being input in FIG. 1 on line 16. The data bits on the second column under the title C are candidate bit locations or candidate bits representative of whether or not the data bits are in actuality framing bits. The candidate bit positions are initially loaded with logic "0" and these locations are changed to having a logic "1" stored therein whenever the logic 18 determines that a particular bit in the stream of incoming bits is not potentially a framing bit. Since the framing bit herein changes in logic value upon each occurrence and since they occur every 386 bits in the serial bit stream, the logic circuit can make a comparison of each incoming bit with a bit stored 386 bits previously and if they do not compare (positive comparison), they are regarded as still a candidate. If there is a negative comparison, that is if they are both logic ones or both logic zeros, then this is no longer a candidate and the candidate bit location is filled with a logic "1." When all of the candidate bit locations are filled with logic "1"s except for one candidate bit position, it is then assumed that the associated bit in the A column is a framing bit. The columns A' and C' are representative of data bits received 193 bits earlier in the bit stream than those appearing in column A.

As may be observed from looking at FIG. 10 which is representative of the condition of memory 189 addresses later than that shown in FIG. 9, it can be determined that the bits under columns A and C for words one through three are the same as in FIG. 9. However, from words four through one hundred ninety two, the candidate bits that were a logic "1" under column C have all been transferred intact to column C' in FIG. 10. The same is true of the data bits. This is accomplished through the feedback block 26 of FIG. 1. As previously indicated the transfer takes place on lines 140 and 142 of FIG. 3. Further, the candidate bits that were a logic "1" in column C' of FIG. 9 in address positions 4 through 182 are transferred back to column C in FIG. 10 and remain as a logic "1." Some bits were eliminated as potential candidates between FIG. 9 and FIG. 10 such as the candidate bit in word four under column C. In FIG. 9 this was a logic "0" (column C') but because the negative comparison of a logic "1" under the column A' bit in FIG. 9 with the logic "1" in the A column of FIG. 10 indicated this could not possibly be a frame bit, a logic "1" was inserted to illustrate that this is no longer potentially a candidate bit. Proceeding to word six it will be noted that the data bit in FIG. 9 column A' is a logic "0" and this is compared with a logic "1" in word six column A of FIG. 10. The last two referenced bits alternated in value and thus the candidate bit remains as a logic "0" to show that this may potentially be a framing bit since so far in the framing process it has remained as an alternating function.

OPERATION

Figure 10:
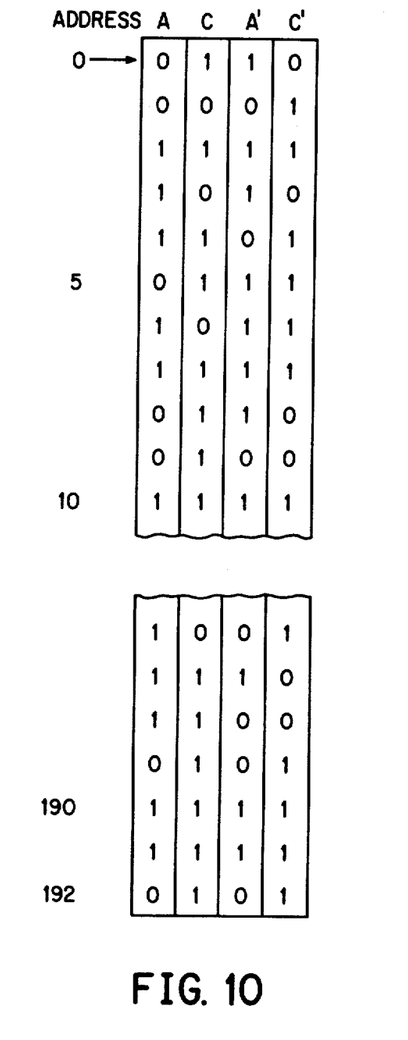
FIG. 10 is a further representation of memory 10 for use in conjunction with FIG. 9 in explaining the concept behind the framing circuit of FIG. 1.

The detailed description of FIGS. 9 and 10 provides an insight into the framing process of FIG. 1. Basically, data is input on line 16 and inserted into memory 10. The framing bits on the incoming data in one embodiment of the invention occurred at 386 bit intervals in a serial bit stream incoming on line 16. Also, the framing bits alternated in logic value for each succeeding bit. Thus, the logic bits are inserted into memory 10 and then compared 386 received bits later in logic 18 to determine whether or not a particular bit is the framing bit. Every time a negative comparison occurs, that potential bit position in the bit stream is eliminated as a framing bit candidate. When all the positions have been eliminated except one, an indication is provided that the framing bit location in the bit stream has been located and thus a location of the framing bit or framing bit detection has been finalized. Since four bit word memories are inexpensive, off the shelf items, the memory was doubled up wherein the incoming bit along with a "candidate" bit are stored in the first two columns of a memory word location immediately after each comparison. When that word is addressed on a subsequent cycle, the data bit and the candidate bit are then moved to the last portion of the word such as columns A' and C' in FIG. 9 or 10 to continue the storage process for a total of 386 incoming bits. Thus, a convenient easily accessible memory chip can be utilized and the counter size can be minimized in the overall design.

Using the above as background it will be determined that the feedback 26 is merely used to reposition the bits from columns A and C in the memory to columns A' and C' 193 clock inputs from counter 12 after the data is initially input to memory 10. Another 193 bits later, the data is output on lead 28 after passing through register 24 and compared with incoming data on lead 16 and if the position had been previously indicated a potential candidate bit, and it is no longer a candidate, the candidate bit position has its logic "0" changed to a logic "1."

Referring to FIG. 2, it will be noted that incoming data is passed through phase-lock loop and demodulator 34 and then supplied to logic block 38. Logic block 38 in FIG. 2 is the same as logic block 18 in FIG. 1. The counter 12 in FIG. 1 is replaced by counter 84 in FIG. 2 with the select switch 108 conditioned to accept the two least significant bits from counter 84 and pass these two bits through select switch 106 along with the six most significant bits on lead 102 to provide the address to memory 54. The counter 78 counts the number of logic "1"s appearing in the candidate bit position of memory as they pass through the logic block 38 and whenever a logic "0" is received, the counter 78 is reset. If however 385 consecutive logic "1"s are received, the AND gate 80 is activated and a signal is passed on reset line 82 to initialize counter 84 and to the control block 52 to convert the apparatus to the operational mode. These signals are supplied to the control block 52 and the access control block 58.

When changing from the framing mode to the operational mode, the input signals are no longer input to memory 54 through the logic 38 since the select switch 42 is altered to receive signals from serial to parallel converter 48. Serial to parallel converter 48 changes the incoming data bit stream from serial to four parallel output bits such that the entire word location in memory is filled with data bits rather than part of it being filled with candidate bits as was the case in the framing sequence. The switch 106 operates on an alternating basis wherein the write address is first inserted into memory 54 and a word from converter 48 is input to memory. Then, the switch 106 is changed to its alternate position by access control 58 and a read address is applied to memory 54 to provide an output word on lead 68. The function being accomplished in the operational mode is an elastic store operation which is more completely described in my previously referenced application Ser. No. 871,575 on Slip Control Apparatus. However, the primary purpose of the slip control 88 is to prevent the read and write addresses from approaching each other and thereby creating potential interference and a "dithering" in output words with respect to the input words in memory 54. In the operational mode, the two least significant bits of each of the counters 84 and 112 are not used in the address. Rather, two additional bits from each of the mod 4 counters 86 and 90 are used. However, the six most significant bits of each of the counters 84 and 112 are reduced in importance to the six least significant bits of the total address. Thus, the mod 4 counters determine a quadrant of words in memory such that each quadrant contains ¼ of the word locations on a consecutively occurring basis. The slip control circuit 88 is designed such that the read and write operations cannot occur in the same quadrants. Thus, there can never be any interference although it will be realized that on an occasional basis there is a loss of data when the slip control prevents incrementing of one of the mod 4 counters to compensate for the short-term frequency variations between the recovered clock obtained from incoming line 32 and the local clock used on the output side of the data being used.

It will be realized that while the memory 54 is not used for framing purposes during the operational mode, the phase-lock loop is still being used to provide a recovered clock signal for operational purposes and the counter 84 is used to designate the framing bit.

The two least significant bits from the counters 84 and 112 are used in conjunction with the serial to parallel and parallel to serial converters for timing purposes.

Since the input data bits must be output from converter 48 into memory 54 at times prescribed by the recovered clock, the data must be read from memory 54 into register 56 at intermediate times and then output from register 56 at a rate determined by the local clock. If the local and recovered clock were synchronized, then register 56 (as well as most of FIG. 2) would not be required.

Summarizing the above, it will be realized that the present invention comprises in part a simplification in that the memory 54, the phase-lock loop 34, the write counter 84 and register 56 are common to both the framing mode and the operational mode and thus there is a savings in parts. Further, although the approach used for framing is remotely similar to a Mahoney U.S. Pat. No. 3,539,997, the use of a memory to perform the synchronizing operation is vastly superior in maintaining synchronization if there is considerable short-term variation in frequencies on the incoming data with respect to the local clock frequency.

While I have disclosed one embodiment of the inventive concept, it will be realized by those skilled in the art that there are many other ways of practicing the invention and I wish to be limited only by the scope of the appended claims wherein I claim:

1. Combination slip control and framing circuit apparatus having separate framing and operational modes comprising, in combination:

memory means for storing data bits including address input means for inputting addresses, data input means for inputting data and data output means for outputting data;

write address means for supplying write addresses including frame modulo counter means for counting;

read address means for supplying read addresses including counter means for counting;

slip control means connected to said read and write address means for detecting a predetermined relationship between read and write addresses and for readjusting the count of one of said address means by an integral number of frames when the address counts achieve a predetermined relationship in the operational mode;

logic means for comparing incoming data bits with return data bits for ascertaining framing bit position;

first connection means connecting said memory means to said logic means for supplying output data bits as return data bits thereto;

first mode control means connected between said logic means and said data input means of said memory means for passing data therefrom in the framing mode;

data supply means, connected to said first mode control means, for supplying data therethrough in the operational mode;

second connection means connecting said data supply means to said logic means for supplying incoming data thereto in the framing mode;

frame detection means, connected between said logic means and said frame modulo counter means, for resetting said counter means to a predetermined count when frame synchronization is obtained and the apparatus is ready to be altered to the operational mode;

third connection means, connected between said address input means of said memory means and said read and write address means for supplying a frame modulo count to said memory means during the framing mode and for supplying read and write addresses thereto during the operational mode; and control means, connected to said first mode means and said slip control means for altering said apparatus from the framing mode to the operational mode after frame synchronization occurs.

2. Apparatus as claimed in claim 1 wherein:

said memory means is divided into definable and addressable sections; and said slip control means prevents read and write operations from occurring in the same sections.

3. Frame detection apparatus for detecting frame bits occurring every n serial logic bits where n is an integer comprising, in combination:

memory means for storing logic bits having 2n logic bit locations with 2n/S addressable word locations with each word being S bits long;

2n/S modulo address counter means, connected to said memory means, for sequentially addressing said memory means on a repeating basis;

data supply means for supplying serial data wherein synchronizing bits occur every n received logic bits;

initialization means, connected to said memory means, for initializing the apparatus by inserting a candidate bit of a given logic value in said memory means for each of n logic bits;

logic means, connected to said data supply means and said memory means, for comparing logic bits stored n bits of time earlier with presently received logic bits, for generating disabling candidate bits of a second logic value different from said given logic value on the first occurrence of a negative comparison and for readjusting the location of a logic bit and its associated candidate bit within an addressed word location upon each comparison; and means for providing an output from said apparatus when only one candidate remains to indicate the framing bit.

4. Apparatus as claimed in claim 3 wherein:
n = 193;
a word is 4 bits; and
said logic means includes an exclusive OR gate means for comparing the present logic bit with the logic bit received 386 bit periods previously and wherein the framing bits being detected alternate in logic value.

5. The method of detecting framing logic bits in a serial stream of logic bits wherein a framing bit occurs every n consecutive logic bits where n is an integer comprising the steps of:
   filling n candidate locations in an electronic memory with logic bits of a given logic value for initialization of a framing sequence;
   addressing data bit locations in the memory on a repeating sequence basis;
   initially storing n logic bits, where n is an integer greater than 1, from the stream, in locations in said electronic memory wherein each one is retrieved with its corresponding candidate bit in the addressing sequence;
   comparing each presently received bit with the bit received and stored n bits earlier;
   changing the logic value of the candidate bit if the comparison is negative;
   storing the most recently received logic bit from the stream along with its associated candidate bit; and
   providing an output indicating frame detection when all but one candidate bit has been changed from the initialized logic value.

6. Apparatus for detecting framing logic bits in a serial bit stream of logic bits wherein a framing bit occurs every n consecutive logic bits where n is an integer comprising, in combination:
   memory means for storing logic bits including address means for receiving addresses, data bit input means for inputting data and data bit output means for outputting data;
   first means, connected to said memory means, for filling n candidate locations in said memory means with logic bits of a given logic value for initializing a framing sequence in the apparatus;
   second means, connected to said address means of said memory means, for providing data bit addresses of locations in the memory means on a repeating sequence basis;
   third means for supplying a stream of data bits including framing bits;
   fourth means, connected to said data input means of said memory means, for initially storing n logic bits from the stream in locations wherein each of the n logic bits is retrieved with its corresponding candidate bit in the address sequence;
   fifth means, connected to said data output means of said memory means and to said third means, for comparing each bit from said third means with the bit received n bits earlier and stored in said memory means;
   sixth means, connected to said fifth means, for changing the logic value of the candidate bit if the comparison by said fifth means is negative;
   seventh means, connected to said fifth and sixth means, for storing the most recently received data bit from said third means along with its associated candidate bit; and
   means, connected to said sixth named means, for providing an output indicating frame detection when all but one candidate bit has been changed from the initialized logic value.

7. Combination elastic store and framing apparatus comprising, in combination:
   random access memory means for storing logic bits;
   address means connected to said memory means for supplying read and write addresses thereto;
   first logic means, including framing bit counter means, connected to said memory means and said address means, for establishing the framing bit in a series of consecutively applied incoming logic bits and utilizing the memory means in a first function by, (1) comparing all incoming bits with those stored n bits earlier in said memory means where n is an integer and greater than "1", (2) storing a logic "1" in said memory means in a location, previously initialized with a logic "0," if the comparison is negative, (3) counting the number of consecutively occurring logic "1"s with said framing bit counter means until n − 1 logic "1"s are counted; and (4) establishing framing using the nth count of the counter as a framing bit position indicator where the framing bit occurs every nth incoming logic bit; and
   second logic means connected to said memory means and said address means for storing incoming data bits in said memory means in an elastic store second function in accordance with write addresses and later outputting data bits from said memory means in accordance with read addresses, after framing has been established, for synchronizing incoming data to a local clock.

* * * * *